US012710744B2

(12) United States Patent
Balinsky et al.

(10) Patent No.: US 12,710,744 B2
(45) Date of Patent: Aug. 18, 2026

(54) OBJECTS OF INTEREST IN ADDITIVE MANUFACTURING

(71) Applicant: Peridot Print LLC, Palo Alto, CA (US)

(72) Inventors: Helen Balinsky, Bristol (GB); Boris Balacheff, Meudon Cedex (FR)

(73) Assignee: PERIDOT PRINT LLC, Palo Alto, CA (US)

( * ) Notice: Subject to any disclaimer, the term of this patent is extended or adjusted under 35 U.S.C. 154(b) by 545 days.

(21) Appl. No.: 17/928,902

(22) PCT Filed: May 27, 2021

(86) PCT No.: PCT/US2021/034474
§ 371 (c)(1),
(2) Date: Nov. 30, 2022

(87) PCT Pub. No.: WO2021/247357
PCT Pub. Date: Dec. 9, 2021

(65) Prior Publication Data
US 2023/0229143 A1 Jul. 20, 2023

(30) Foreign Application Priority Data
Jun. 1, 2020 (EP) .................................... 20305572

(51) Int. Cl.
*G05B 19/418* (2006.01)
*B33Y 50/00* (2015.01)

(52) U.S. Cl.
CPC ........ *G05B 19/41835* (2013.01); *B33Y 50/00* (2014.12); *G05B 2219/49023* (2013.01)

(58) Field of Classification Search
CPC .... G05B 19/41835; G05B 2219/49023; B33Y 50/00; G06Q 30/0241
See application file for complete search history.

(56) References Cited

U.S. PATENT DOCUMENTS 9,626,489 B2 4/2017 Nilsson
10,719,679 B2 * 7/2020 Glazberg ........... G05B 19/4099
(Continued)

FOREIGN PATENT DOCUMENTS

JP 2015229311 A * 12/2015

OTHER PUBLICATIONS

Li, Z., et al. "C3PO Database and Benchmark for Early_stage Malicious Activity Detection in 3D Printing", arXiv, vol. 1, Mar. 20, 2018, pp. 1-20.
(Continued)

*Primary Examiner* — Chad G Erdman
(74) *Attorney, Agent, or Firm* — Michael Dryja

(57) ABSTRACT

An example method for use in additive manufacturing comprises operating, by a processor, on object model data, the object model data describing an object to be generated in an additive manufacturing process. The example method comprises determining, by a processor, based on the object model data, whether a portion of the object to be generated is identified as an object of interest. In response to a determination that a portion of the object to be generated is identified as an object of interest, then the method comprises determining, by a processor, whether a policy-based action is associated with the object of interest. In response to a determination that a policy-based action is associated with the object of interest, then the method comprises executing, by a processor, the policy-based action, and generating, by a processor, the object according to the policy-based action.

20 Claims, 5 Drawing Sheets

(56) References Cited

U.S. PATENT DOCUMENTS

| | | | | |
|---|---|---|---|---|
| 2014/0039659 | A1 | 2/2014 | Boyer et al. | |
| 2014/0058959 | A1* | 2/2014 | Isbjornssund | G06Q 50/184 705/310 |
| 2015/0198052 | A1 | 7/2015 | Pavlov et al. | |
| 2015/0279525 | A1 | 10/2015 | Reep et al. | |
| 2016/0170387 | A1 | 6/2016 | Yasuyuki | |
| 2017/0039363 | A1* | 2/2017 | Chen | G06F 21/44 |
| 2017/0308977 | A1* | 10/2017 | Li | G06T 7/0006 |
| 2018/0114289 | A1 | 4/2018 | Lee et al. | |
| 2018/0297114 | A1 | 10/2018 | Preston et al. | |
| 2019/0065702 | A1* | 2/2019 | Nilsson | G06F 21/10 |
| 2019/0329500 | A1 | 10/2019 | Tobia et al. | |
| 2020/0070423 | A1 | 3/2020 | Griffin et al. | |
| 2020/0264585 | A1* | 8/2020 | Ryan | H04N 1/00838 |
| 2021/0357542 | A1* | 11/2021 | Bowen | G06F 30/12 |

OTHER PUBLICATIONS

Pham, G. N., et al., "Anti-3D Weapon Model Detection for Safe 3D Printing Based on Convolutional Neural Networks and D2 Shape Distribution", Symmetry, vol. 10, No. 4, Mar. 31, 2018, pp. 1-15.

* cited by examiner

502
Machine-readable medium
506
Instructions

OBJECTS OF INTEREST IN ADDITIVE MANUFACTURING

BACKGROUND

Some additive manufacturing systems generate three-dimensional objects on a layer-by-layer basis through the selective solidification of build material.

BRIEF DESCRIPTION OF DRAWINGS

Non-limiting examples will now be described with reference to the accompanying drawings, in which.

DETAILED DESCRIPTION

Figure 1:
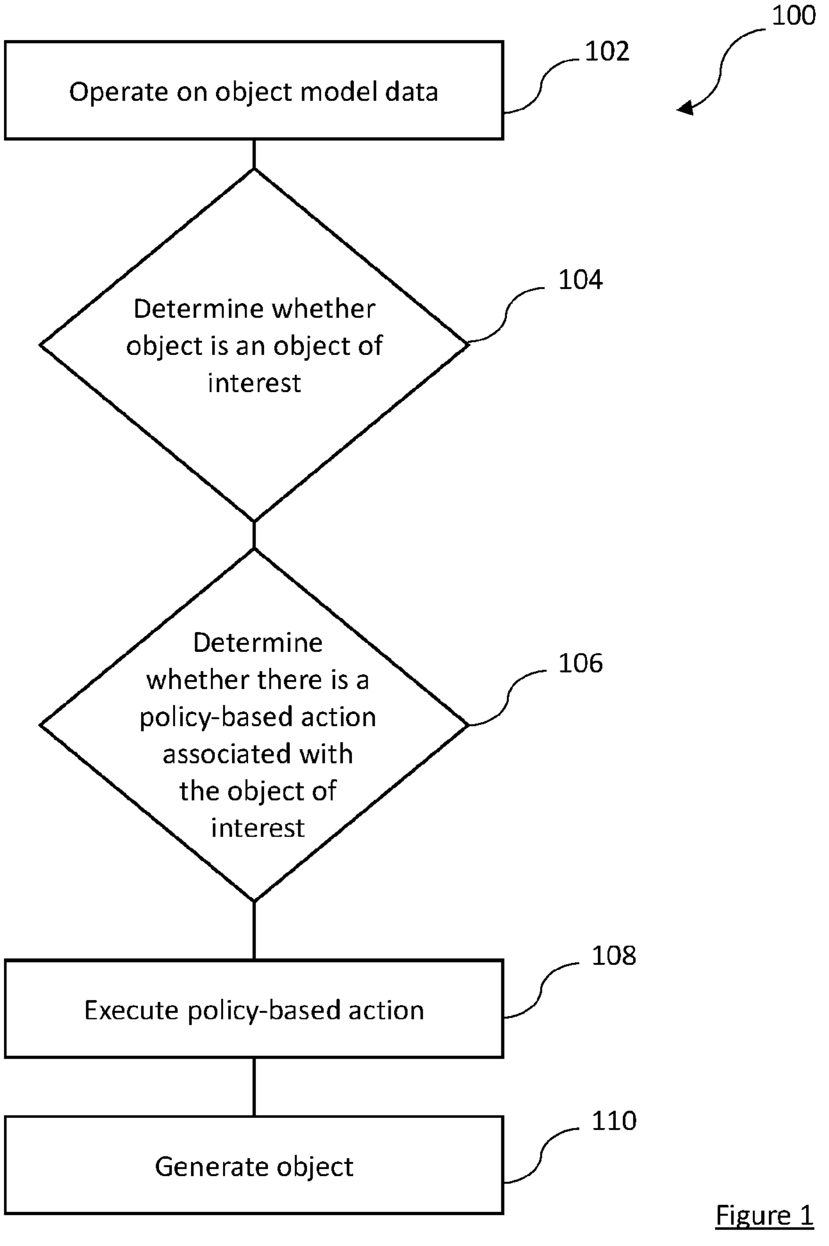
FIG. 1 is a flow chart of an example method.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A “HP PA12” available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a ‘coalescence agent’ or ‘coalescing agent’ (for example, a fusing agent in examples where the build material comprises a plastics powder, or a binder agent in examples where the build material comprises a metal powder) may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the plastic build material coalesces and solidifies to form a slice of the three-dimensional object in accordance with the pattern. The binder agent may have a composition that, when heated or when UV energy is applied, causes the metal particles of build material to which binder agent is applied to adhere to one another. In other examples, coalescence may be achieved in some other manner.

According to one example, a suitable fusing agent may be an ink-type formulation comprising carbon black, such as, for example, the fusing agent formulation commercially known as V1Q60A “HP fusing agent” available from HP Inc. In one example such a fusing agent may additionally comprise an infra-red light absorber. In one example such a fusing agent may additionally comprise a near infra-red light absorber. In one example such a fusing agent may additionally comprise a visible light absorber. In one example such a fusing agent may additionally comprise a UV light absorber. Examples of print agents comprising visible light enhancers are dye based colored ink and pigment based colored ink, such as inks commercially known as CE039A and CE042A available from HP Inc.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

As noted above, additive manufacturing systems may generate objects through the selective solidification of a build material comprising plastic particles or metal particles (for example a stainless steel powder). This may involve depositing build material in layers on a print bed, or build platform and selectively depositing a fusing agent (in examples where the build material comprises plastic particles) or a binder agent (in examples where the build material comprises metal particles), for example using printheads to jet the agent, onto portions of a layer of build material in a pattern derived from data representing a slice of a three-dimensional object to be generated (which may, for example, be generated from structural design data). When heat is applied to a layer of build material, those portions of build material to which fusing agent (or binder agent) was applied will heat and coalesce.

In the example of a plastics build material, the portions of build material treated with fusing agent absorb energy (e.g. heat energy), coalesce, and solidify to form a slice of the three-dimensional object in accordance with the pattern. Following the application of energy therefore, the portions of build material to which fusing agent was applied heat up, coalesce, and then solidify upon cooling to form the three-dimensional object. Any build material to which fusing agent was not applied (un-coalesced, “loose” build material, or build material remnant), e.g. those parts of the build material that will not form part of the generated object, will not solidify and remain as un-coalesced, loose, excess, build material. Following the application of energy, therefore, the three-dimensional object may therefore be embedded and/or at least partially surrounded by un-coalesced, loose, build material which will need to be separated from the object prior to any subsequent operations (e.g. a post-processing operation such as dyeing).

In the example of a metal build material, the binder agent may comprise an adhesive element (for example a polymeric concentrate) suspended within a liquid carrier that will cause portions of build material to which binder agent was applied to coalesce during a curing process. For example, following the layer-wise deposition of the metal build material and the selective deposition of the binder agent thereon the build platform and/or the powder contain therein may undergo a curing process during which the build material (including the layers of build material with the binder agent applied and surrounding build material to which no binder agent has been applied) is subjected to heat or UV light. The temperature may vary depending on the composition of the build material or other factors. During the curing process, the binder agent, applied to portions of the build material, is thermally activated when subject to the curing temperatures, causing adhesive particles (e.g. polymeric particles) to separate from the liquid carrier and adhere to particles of the build material while the liquid carrier evaporates, leaving the portions of build material to which binder agent was applied solidifying and effectively being glued together. Post-curing, any build material to which binder agent was not applied ("loose" build material, or build material remnant), e.g. those parts of the build material that will not form part of the generated object, will not solidify and remain as loose, excess, build material. Curing may be performed on a plurality of layers of build material, in other words a whole volume of build material may be subject to heat to cure the whole volume of build material at substantially the same time. For the curing process, the build platform may be moved to a separate curing station comprising a curing oven or similar.

After curing, the solidified build material (those portions of the build material to which binder agent was applied and have adhered during curing due to the activation of the adhesive) may be referred to as a "green part", being unfinished but substantially resembling the final part, and being a loosely bound part having a relatively low density. Once cured, to form the final object to be generated from the metal build material, the green part is transferred to a sintering oven in which the green part undergoes a sintering process. During sintering, the green part is exposed to elevated temperatures to sinter the build material particles (of the green part) into the final, solid, three-dimensional object (which will have a higher density than the green part).

Some examples herein relate to the identification of a portion of an object to be generated in an additive manufacturing process as an "object of interest". In some examples the object of interest may be an object with an associated policy (for example an associated rule, information or instructions). In other examples, the object of interest could be an object that is rights-restricted. In yet other examples, the object of interest could be an object that is dangerous or illegal. If a portion of the object to be generated is identified, or classified, as an "object of interest" then some examples herein relate to determining whether a policy-based action is associated with the object of interest and then the object is generated according to that policy-based action. More specifically, in some examples, if it is determined that a policy-based action is associated with the object of interest then the policy-based action is executed and the object is generated according to the policy-based action (this may also be referred to as generating the object "according to the policy"). The policy-based action may comprise a set of instructions that, when executed by a processor, cause the processor to perform an action defined by the policy. For example, and as will be described below, a policy may be associated with an individual object (e.g. a portion of an object to be generated) and/or a category/type of objects (e.g. all objects in one particular print job) and there may exist a policy associated with such an individual object (e.g. delay the printing etc.) or with all objects belonging to that particular category (e.g. include information on that object etc.) and executing the policy-based action associated with these objects may cause the objects to be generated according to the policy (e.g. delaying the generation of the object or generating those objects with the information, etc.).

A policy-based action associated with an object of interest may be a policy that is to change the object, for example to modify the object model data. This type of policy may be associated with objects that are identified as dangerous or illegal and, accordingly, the changing of the object may be to ensure that, once printed, the objects are safe. In these examples, the policy may be to change the object (by modifying the object model data) to add a pattern (for example a serial or identification number or any covert/overt identification, or any other tracker or marker). In other examples the "pattern" may be marketing material. In these examples, the object of interest may comprise an object to be sold and the associated policy may be to mark the object with marketing information. The policy may be to reduce the quality (or resolution) of the resultant object generated according to the modified data (for example, if the resolution of part of a gun were changed it may not be able to function as gun). The policy may be to add new portions to the object (e.g. to modify the object model data by including new object model data), the resultant object generated according to the modified data may then have an extra portion when compared to the original object. In these examples this may cause, for example, a gun's muzzle to be sealed, or an extra component to block the movement of the trigger. In some examples, the object model data may be modified to change a property of the object (for example a geometrical property or otherwise), for example modifying the object model data describing a gun to permanently seal the gun's muzzle or turning the gun into a replica which is not able to fire etc. In other examples the policy may cause a portion of an object to be changed where that portion is not a dangerous/illegal object etc.

In other examples the policy may not describe a change to a portion of the object. For example, the policy may not be to cause a modification of the object model data. Put another way, according to some examples, executing the policy-based action may not cause the object model data to be modified. In these examples, executing the policy-based action may cause a secondary function to be performed. For example, executing the policy-based action may cause a notification to be sent (e.g. to a user of an additive manufacturing system). The notification may be caused to be sent immediately or after a predetermined delay period or may be related to an event. According to another example, executing the policy-based action may cause information to be logged (e.g. stored), for example in an additive manufacturing system. In these examples, the identification of a portion of object as an object of interest may cause the object model data to be stored to assist in the future identification of similar objects of interest. According to other examples, executing the policy-based action may cause the print job (e.g. the generation of the object in an additive manufacturing process to be delayed (e.g. postponed). For example, a policy may prevent generation of objects of interests after-hours, where there is restricted security, reduced control and/or accountability (as may be the case, for example, where a facility is licensed to produce some special types of object of interest during working hours, due to full personnel being available, for example, but not afterhours where, for example, there may be limited/reduced personnel available. In these examples, this may correspond to allowing a certain object to be generated after-hours or during a down-time of an additive manufacturing machine. According to other examples, executing the policy-based action may cause a request to be sent (e.g. to a server), the request being a request for the right to produce the object. In these examples, the portion of the object may be identified as an object for which there exists a legal right (e.g. an intellectual property right). Put another way, the object of interest may comprise an object for which there is an associated right and the policy-based action may cause a check to determine whether the user/printer is permitted to generate the object, or the policy may comprise associated conditions that may determine whether the object is generated or in what form the object is generated. For example, in examples where a policy has associated conditions then, depending on whether those policy conditions are satisfied, the applicability of policy and the corresponding action is determined. For example, the policy condition could describe the applicability of the policy to the object to be generated. In these examples, when the policy conditions are met, policy prescribed modifications are applied to the object, as well as any other actions prescribed by the policy are executed.

The identification of an object as an object of interest may "activates the policy" in the sense that following identification as "of interest" it is determined whether an associated policy exists (whose conditions are satisfied by the object). In some examples there more than one policy and/or policy conditions may be associated to an object identified as an object of interest. As described in the example above, one example policy condition could be if (current-time is after-hours) is true, then forbid/delay printing, if (current-time is after-hours) is false, then allow printing.

Therefore in some examples, as in this example, the policy describes a conditional action. In this example, the condition is (current-time is after hours) and depending on the condition a different action is taken (forbid/delay printing in the case of the condition being true and allow printing if the condition is false). A number of conditions may be associated with a particular policy and the action taken may depend on whether each condition is satisfied (e.g. true or false). In some examples a policy may comprise a number of policy elements. The number of policy elements may comprise a policy condition and/or a policy effect and/or a policy action. A policy element may comprise a single policy element, a multiple policy element, an optional policy element (e.g. a few policy conditions), for example. For example, a policy element may comprise the following instructions (presented generally to illustrate the example):

"object of interest ID-123" AND ("after-hours" OR "national-holiday")

with policy effect "Deny" and a few policy actions ("notify admin" and "stop printing").

This example policy would prevent printing of objects, identified as "objects of interest" in after-hours and national holidays. Therefore, an associated policy effect may comprise "Allow" or "Deny", whether a policy specifically allows an action, which may be otherwise forbidden, or denies it. An action may depend on a condition. Different actions may be assigned to the same policy depending whether a policy condition is satisfied or not. Therefore, according to some examples, a policy condition may be checked to determine whether the policy is applicable and if it is, the policy is applied (e.g. a policy action is taken). Therefore, if a condition described by a policy is satisfied then an associated action may be taken. In this way, many policies may be deployed simultaneously and may be applied sequential or in parallel to one another. In other examples, executing the policy-based action may cause a check to see if relevant permissions exist to generate the object. For example:

condition={determined-object-type is-equal-to object-type-required-license} action={request-license} if (condition is true), then execute action

Therefore, according to some examples a policy is associated with an object of interest and describe a condition, effect and action. If the condition is satisfied and the effect is true (or false) then the action may be performed. Some examples herein therefore relate to the determination as to whether a policy condition and/or effect is satisfied and, if so, executing an associated action defined by the policy. According to another example, executing the policy-based action may cause a change in the printing process, or cause the printing process to be adjusted (for example by changing the type and/or composition of the building material used to generate the object). According to another example, executing the policy-based action may cause the addition or modification of a program and/or data and/or instructions that are to be stored on a programmable portion of the object.

In some examples the policy-based action, when executed, may cause any number of subsequent actions to be performed. For example, the policy-based action may be to cause a determination to be made as to whether the user possess an appropriate right or permissions and, in a subsequent action, cause the object model data to be modified etc. or, in another example, the policy-based action may be to cause the printing process to be adjusted and the modification of a program and/or data and/or instructions that are to be stored on a portion of the object, etc. (e.g. delay the object generation or to change the agent or build material used in the printing process).

FIG. 1 shows an example method 100. The method 100 may comprise a computer-implemented method. The method 100 may comprise a method of determining whether an object to be generated in an additive manufacturing process is an object of interest. The method 100 may comprise generating an object of interest in an additive manufacturing process, e.g. according to an associated policy-based action. The method 100 may therefore comprise an additive manufacturing method.

The method comprises, at block 102, operating, by a processor, on object model data that describes an object to be generated in an additive manufacturing process. The processor may comprise a processor of an additive manufacturing apparatus. In one example, operating, at block 102, may comprise receiving the object model data. In another example, operating, at block 102, may comprise determining the object model data.

At block 104, the method comprises determining, by a processor, and based on the object model data, whether a portion of the object described by the object model data is identified as an object of interest. Determining, at block 104, may comprise identifying a portion of the object as an object of interest. Identifying may comprise classifying in some examples. In some examples, operating, at block 102, on the object model data may cause the processor to determine, at block 104, whether a portion of the object described by the object model data is a restricted object and/or a dangerous object and/or an illegal object and/or a rights-restricted object, however in other examples the portion of the object may be determined to be of interest where that portion is not a dangerous or restricted object etc. Block 104 may therefore comprising determining, by a processor, whether part of the object model data describes an object that is an object of interest. In some examples determining, at block 104, may comprise comparing part of the object model data to stored model data, where the stored model data relates to a restricted portion of an object. If the compared part of the object model data is at least a partial match (e.g. a full match, approximate or a "fuzzy match") to the stored model data then the object described by the object model data may be determined to be an object of interest. In these examples, the determination is performed based on part of the object model data being the same, or similar within a predetermined threshold, as a stored, object of interest. In other words, a database may store data describing portions of objects that are identified as objects of interest and it is determined, e.g. at block 104, whether part of the object model data describes such an object. In these examples, the database may be updated with new objects of interest or types and/or categories of objects of interest. In other examples, determining, at block 104, may comprise determining using an artificial neural network or other methods that the object is identified as an object of interest. Block 104 may comprise determining whether part or whole of the object model data describes (a portion of) an object that is identified as an object of interest. Block 104 may therefore comprise determining whether the object described by the object model data is an object of interest. In other words, a portion of the object identified as an object of interest may comprise the whole object however, in other examples, any portion of the object may lead to its identification as "of interest". In these examples, a portion of an object may be "just similar enough" to lead to the identification as "of interest", depending on the example. The match may therefore comprise a full, partial, or approximate (or fuzzy) match, etc., depending on the example. Operating on the object model data, e.g. block 102, may comprise determining whether a portion of the object described by the object model data is identified as an object of interest, e.g. block 104.

At block 106, the method 100 comprises determining, e.g. by a processor, whether there exists a policy-based action associated with the object. Block 106 may comprise accessing a database storing a policy-based action for the portion of the object identified as an object of interest (or for that type of object, see below). Any storage for policies (e.g. a database) may also store associated policy-based actions. Determining, at block 106, may comprise retrieving the policy-based action, e.g. from a database. Block 106 may comprise determining whether a policy exists that is associated with the object of interest. As mentioned above, a policy may comprise, in addition to an action to be taken, a condition and/or effect. For example, as described above, the condition may be "is object part of print job A" and if this condition is satisfied the effect of "allow print" may be applied to the print job which may be printed according to the policy action "print object with identification marker", the marker being described by the action. Block 106 may therefore comprise determining whether a condition and/or and effect described by the policy is satisfied and block 106 may comprise determining whether an associated action exists it eh condition and/or effect is satisfied.

At blocks 108 and 110, respectively, the method 100 comprises executing, e.g. by a processor, the policy-based action associated with the portion of the object that was identified (at 104) as an object of interest, the policy-based action begin determined at block 106, and generating the object according to the policy-based action. As will be discussed below, in some examples executing (block 108) the policy-based action may cause the object to change by changing a part of the object model data describing the object in which case block 110 comprises generating the object according to the modified instructions. Block 108 may be performed concurrently with block 106. In other words, determining that a policy-based action is associated with the object of interest, retrieving and executing the policy-based action may be performed concurrently.

In some examples, block 104 may comprise determining the type and/or category of the portion of the object, and/or determining whether the portion of the object belongs to a type and/or category of interest, and block 106 may comprise determining whether a policy-based action is associated with the object type and/or category. In other words, according to some examples, block 104 may comprise determining, by a processor, based on the object model data, the category of the portion of the object described by the object model data, and block 106 may comprise determining, by a processor, whether an assigned policy-based action is associated with the determined category. For example, block 104 may determine that a portion of the object is identified as an object of interest and the policy-based action assigned to this objects of interest may cause a delay in the printing process, so that this print job is performed at a later time; this delay in the printing may reflect the urgency of this print job relative to other print jobs etc. (or, in some examples, the action may be to cause cancellation of the print job, or to cause the object to be replaced by a modified object as described elsewhere herein). By way of another example, block 104 may determine that a portion of the object is a knife and the policy-based action associated with any portion of an object identified as a "knife" may be to cause the sharp/cutting edge of the knife to be blunted. More specifically, the policy-based action assigned to knife may be to cause the object model data to be modified to blunt the cutting edge of the knife. By way of another example, a particular category (or set) of objects may have a policy-based action associated with that category, and the policy may describe the type of print agent or build material that is used to generate those objects, in which case executing the policy-based action may cause the appropriate print agent or build material to be used to generate the object. By way of another example, the following may describe a sequence of executing an action associated with a policy according to object type: comparing Object A to objects in a database and determining that Object A is similar to Object X from database (block 104), assigning a label of "Object X" to object A (for example, if object X is a cup, then object A is a cup too), selecting policies relevant to object type "cup-"→Policies (cup) (block 106) and checking policy conditions for all relevant policies (select subset of Policies(cup), conditions of which are true) and execute actions associated with Policies(cup), conditions of which are true (block 108). The object is then generated according to the executed action and according to the policy (block 110).

Figure 2:
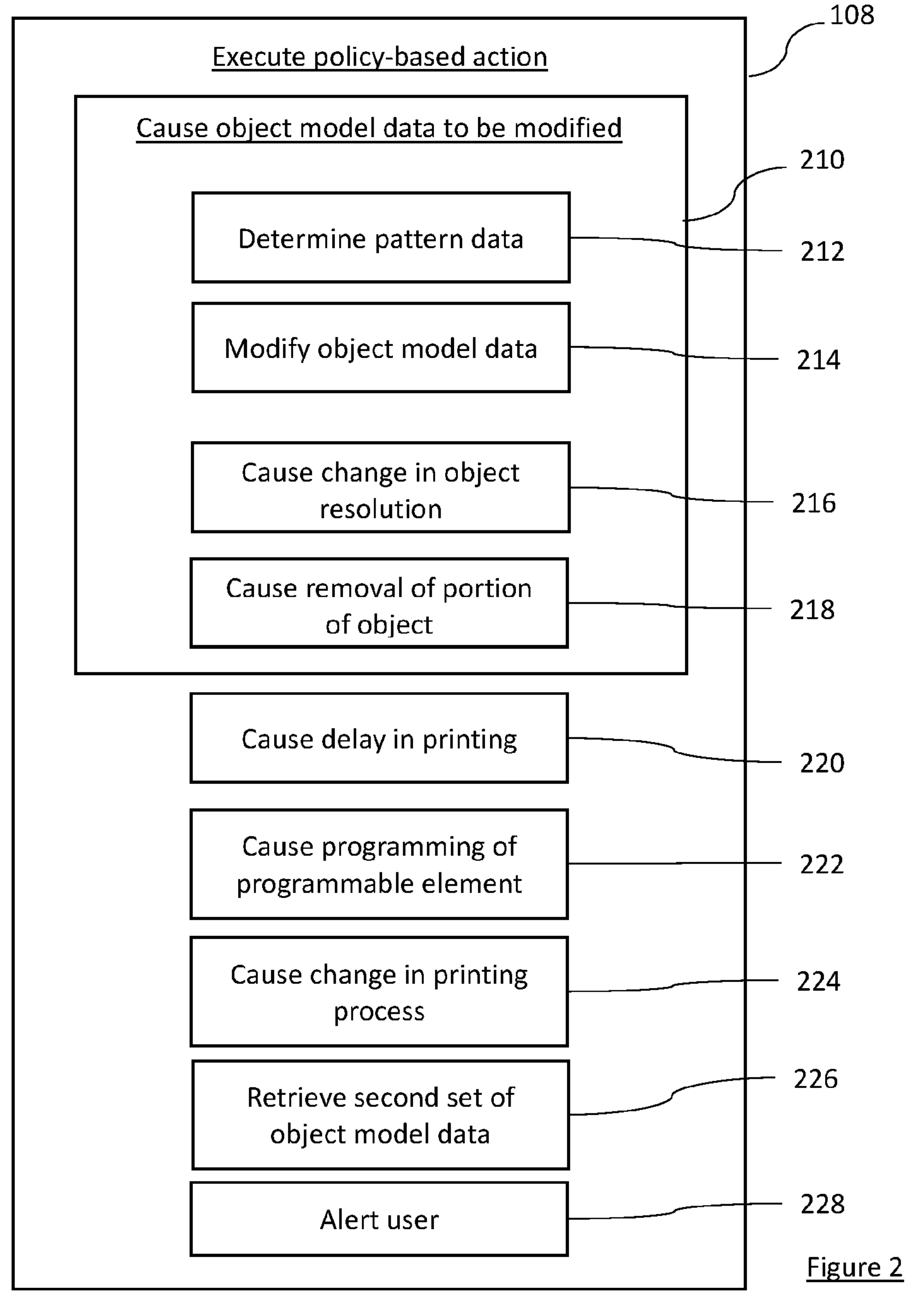
FIG. 2 is a flow chart of an example method.

FIG. 2 shows various examples of block 108 of the method 100 according to. Block 108 may comprise any number of the blocks 210, 220, 222, 224, 226 and/or 228 as will now be described.

According to one example, executing the policy-based action may comprise, at block 210, causing, by a processor, the object model data to be modified. In this example, block 110 (see FIG. 1) of the method comprises generating the object according to the modified object model data. For example, block 210 may comprise modifying the object model data to include an additional, or new, portion of the object that was not described by the original model data (operated on at block 102). In these examples, the policy-based action may define the component of to be included into the object, and executing the policy-based action may cause the object model data to be modified to include the component. As shown by the blocks 212-218, once a portion of the object has been determined, at block 104, to be an object of interest, the data may be modified according to a number of methods, with each method (way that the object model data is modified) being determined by the policy-based action associated with the object of interest.

For example, as indicated at block 212, modifying the object model data may comprise determining, by a processor, pattern data describing a pattern to be formed on a portion of the object to be generated. In this example modifying the object model data may comprise modifying, block 214, the object mode data to include the pattern data determined at block 212. The policy-based action may describe the pattern data in which case determining the pattern data may be concurrent with executing the policy but in other examples the policy may comprise instructions to cause pattern data to be determined or retrieved (e.g. by a processor executing the instructions). The pattern described by the pattern data may be intended to be formed on an external surface of the object or on an internal portion of the object. In some examples, the pattern may be intended to be formed both on an external surface and an internal portion of the object. Whether the pattern is to be formed in the interior or exterior of the object depends on the policy-based action. For example, a portion of the object is determined to be an object of interest in that it is an object to be sold (e.g. as part of a batch print) and the policy-based action may be associated with the object itself or the type of object. In these examples, a pattern may be formed on the surface of the object and the pattern may comprise marketing material to be included on the object. In other words, block 106 of the method 100 may comprise modifying the object model data to include pattern data describing a pattern to be formed on any portion of the object. In other examples, the pattern may comprise a letter, number, code, image etc. For example, the object of interest may comprise a restricted object (e.g. an illegal object). In other words, according to one example, upon the identification that the object model data describes a firearm, block 106 may modify the object model data to include a serial number or barcode or other covert/overt, tamper resistant unique identifier/global unique identifier. Then, the firearm generated in the additive manufacturing process according to the modified data has unique identifier such that, if the firearm were to be widely circulated, the number or barcode provides identifiability and accountability. In other words, the method 100 may allow a weapon such as a knife or firearm to be 3D printed but may cause a unique identifier to be printed on, or in, the knife or firearm so that the object is (for example, uniquely) identifiable (e.g. by law enforcement).

In other examples, the pattern may be printed on the exterior of the object. In these examples, the object may be readily identifiable by the naked eye, e.g. as described above each object may be printed with its own unique serial number. However, in other examples, the pattern may be printed on the interior of the object. In these examples, from its exterior appearance the object may appear to be a "normal" object but, upon breaking or wearing away the pattern may be revealed, thereby allowing the object to be identifiable. For example, the policy-based action may be to cause a wear indicator to be formed in the object and therefore for a pattern to be formed on the interior of the object. The pattern, in some example may, be intended to be too small to be identifiable by the naked eye—e.g. requiring some magnification. The pattern may therefore comprise a covert or overt pattern. The pattern may be intended to be formed by etching or engraving on the surface or under the surface, e.g. at a depth in the object. The pattern may be intended to be formed by color variation or by a variation in the physical properties which can be identifiable by the naked eye or may require special equipment to be identified.

In one example the pattern may be formed in the geometry of the object. For example, the pattern may comprise a letter and/or number and the object model data may be modified such that the letter or number is formed by a raised area, or recessed area, in the object. This may be generated by applying, or not applying, a fusing agent and/or detailing agent to a part of a layer of build material that corresponds to a portion of the object having the pattern. How fusing and/or detailing agent is applied may depend on the pattern to be formed in the object which depends on the pattern data which may be defined by the policy of the policy-based action. However, in other examples the pattern may comprise a region of differing appearance to a remainder of the object. For example, the pattern may be an area of differing reflectance, or luminescence etc. when compared to the remainder of the object. In this example, generating the pattern in the object may comprise causing a print agent applicator to apply a print agent (e.g. a fluorescent or colours print agent) to a part of a layer of build material that corresponds to a portion of the object that is to comprise the pattern, according to the pattern data. As above, this pattern may be formed on an external surface of the object or on an internal portion, or both. In other words, in one example the pattern may comprise a luminous region on an external surface of the object and/or a luminous region on an internal portion of the object, etc. In these examples the policy may describe the type of pattern to be formed on or in the object or cause such a pattern to be determined.

As indicated at block 216, modifying the object model data may comprise causing, by a processor, the resolution of a portion of the object described by the object model data to be changed. For example, block 216 may comprise changing the resolution of part of the object model data. In one example, the part of the object model data that is changed, at block 216, may correspond to the portion of the object that was determined to be an object of interest. For example, where the object of interest is a restricted object, block 216 may comprise changing the resolution of part of the object model data corresponding to the portion of the object that was determined to be restricted such that the modified portion of the object (the portion of the object described by the modified part of the object model data) is no longer identified, or classified, as restricted. In another example, the part of the object model data whose resolution is changed, at block 216, may not correspond to the portion of the object that was determined to be restricted. Block 216 may comprise operating on the object model data to decrease the resolution of the object described by the object model data. Changing the resolution of the object model data may mean that when the object is generated (according to the modified object model data, the modified data comprising a changed resolution portion) sharp edges may be softened, or dangerous objects may be rendered unusable, etc. The modified data may therefore describe a object whose functionality has changed when compared to the object described by the original, unmodified, data and/or an object having explicit and/or implicit markings (that may or may not modify the object's functionality) when compared to the object described by the original data.

As indicated at block 218, modifying the object model data may comprise causing, by a processor, a portion of the object described by the object model data to be removed. For example, where the object of interest comprises a restricted object, block 218 may comprise removing part of the object model data. In one example, the part of the object model data that is removed, at block 218, may correspond to the portion of the object that was determined to be restricted. For example, removing the portion of the object that was determined to be restricted may mean that no portion of the object is determined as restricted, and printing of the object can proceed with the restricted portion removed. In another example, the part of the object model data that is removed, at block 218, may not correspond to the portion of the object that was determined to be restricted. For example, if part of the object model data describes a portion of a gun such that this portion of the object is identified as restricted, block 218 may comprise removing part of the object model data corresponding to the trigger of the gun, thereby rendering the modified gun, once generated, to be effectively a non-working replica. In other examples, modifying the object model data may remove and/or add material to the object, scale up or scale down the object or change the object's resolution, as described above. Therefore the action described by the policy may be to remove or add material to the object, scale up or scale down (e.g. adjust the scale) of the object, change the resolution of the object, or changing a property of the object such as the object's flexibility and/or rigidity.

By way of example, a portion of the object described by the object model data may comprise a gun, and the identification of this object as an object of interest may be due to a gun being a dangerous or restricted or illegal object, or the object may be identified as an object of interest as it belongs to the class "gun" or "weapon" etc. or it may be that the object is identified as an object of interest as an additive manufacturing system to perform the method described herein is programmed to detect guns. The policy-based action associated with the gun may be to cause a change in a portion of the gun so that it cannot function as a gun (e.g. by adding a stop-block so as to prevent proper depression of the trigger or hammer, etc, or by removing the trigger or hammer etc. or by changing the resolution of the gun so that it cannot receive a bullet in the chamber etc.).

Executing the policy-based action may comprise, at block 220 causing, by a processor, the object generation to be delayed. In other words, according to some examples the policy-based action assigned to the object or object type may be to delay the 3D printing of the object to a more convenient time. This may be employed in the batch-processing of print jobs, for example. In such examples, a print queue may contain a number of print jobs and, upon the identification that a portion of an object (which may be the whole object) is an object of interest, its generation may be delayed. The time and nature of the delay may be described by the policy associated with the object of interest.

Executing the policy-based action may comprise, at block 222, programming a programmable element of the object defined by the object model data, for example with data and/or instructions. For example, the object model data may describe an electronics-based object to be generated and part of the object model data may describe a programmable element, for example a chip. The policy-based action in this example may describe a set of instructions that is to be programmed onto the chip and executing the policy-based action may cause the instructions to be programmed onto the chip. In another example, the policy-based action may be to cause a program, or data, to be stored by a portion of the object to be changed. According to these examples, executing the policy-based action may causes a change in how a programmable element (to be generated as part of the object) is to be programmed.

Executing the policy-based action may comprise, at block 224, causing, by a processor, a part of the additive manufacturing process to be changed. In this example, the part of the additive manufacturing process that is (caused to be) changed may comprise the type of building material used in the additive manufacturing process. According to these examples, the object may be generated according to the structural design data describing the object, but with a different type of powder, etc., where the type of powder to be used in the printing process may be determined by the policy-based action. In other examples, executing the policy-based action may comprise changing the print agent that is to be used in the generation of the object.

Executing the policy-based action may comprise, at block 226, retrieving a second set of object model data, the second set of object model data describing a second object to be generated in an additive manufacturing process (the object model data in these examples being a first set of object model data describing a first object). In these examples the policy-based action may essentially comprise another object so that the two objects may be printed together. For example, the first object described by the object model data may comprise a mobile phone, and the associated policy-based action may be cause the object model data of a mobile phone case (e.g. a case of suitable dimensions to hold the mobile phone) to be retrieved so that the two may be generated together. In these examples, the second object may be automatically printed (e.g. the policy-based action may cause the second object to be automatically generated according to the second set of object model data) or a user may be able to decide whether to print the second object (e.g. the policy-based action may cause the second set of object model data to be retrieved and then sent and/or displayed to a user, the user may then decide whether to print the second object described by the second set of object model data).

Executing the policy-based action may comprise, at block 228, issuing a warning (for example an audio and/or visual warning) to the user. For example, the warning may be to prompt the user to perform a check. By way of example, the object of interest may comprise an object where there is an associated legal right where the unauthorised production of this object would infringe the right. The warning, issued at block 228, may be to prompt the user to check whether they wish to continue with the printing process (e.g. the user may verify that they are authorised to generate the object). In other examples, the associated policy-based action to a rights-restricted object may cause the object model data to be modified in such a way so that the generation of the object would not infringe the right (e.g. by changing or removing the portion covered by the right, etc.).

The policy-based action may comprise, or by defined by, a set of instructions and executing, by a processor, (e.g. block 108) may comprise executing the set of instructions defining the policy-based action, and the processor executing the instructions may perform the action according to the policy. For example, the policy action may contain information according to which the object model data is to modified (e.g. block 210 as described above) and a set of instructions may define the modification such that, when a processor executes the instructions the processor causes the data to be modified according to the policy. This may in some examples include changing any aspect of an object: geometry, materials, surface finish, as well as adding other objects (inside and outside).

As mentioned above, any number of tasks may be caused to be performed when the policy-based action is executed. For example, executing, block 108, the policy-based action may cause any number or a combination of blocks 210-228 to be performed. By way of example, a policy-based action may describe a microchip to be included into an object and may also define how the chip is to be programmed. Executing the policy-based action in this example may cause the object model data to be modified to include data describing the programmable element (the chip) into the object to create modified object model data describing the object with the chip inside (or outside etc.) and executing the policy-based action may further cause (see block 222) the chip to be programmed with instructions according to (or defined by) the policy-based action. By way of another example, when the object is part of a batch job to be printed for a particular client as part of other print jobs, and the policy-based action may describe both marketing material, or a serial/identification number/code etc. to be include on or in the object (see block 212) and may also describe the type of build material that is to be used to generate the object.

The term object of interest therefore comprises a restricted object (in the sense of the object being covered by a legal right and therefore its unauthorised product would infringe that right, or in the sense of the object being illegal, dangerous, harmful, etc.) or an object whose class has been previously flagged or selected (e.g. by a user) to be an object of interest (for example, the object of interest may be all objects to be printed in a particular print job or any object with which there is an associated policy-based action).

The term policy-based action may therefore comprise any instructions associated with the object of interest which, when executed, cause a function to be performed in accordance with a policy defined by the action. As stated above some example policies defined by the policy based action include changing part of the object, including data such as marketing information, a pattern, text, logo, code, images, etc., delaying a printing process, removing part of an object, causing a change in the printing process (e.g. in the print agent or build material used), causing a programmable element to be programmed, causing an alert to be issued and/or causing a further set of object model data to be retrieved, and executing the policy-based action may cause these actions to be performed (e.g. the model data to be modified, the printing process to be delayed, etc.).

The method 100 may comprise determining control data to control a print agent applicator to apply print agent onto a layer of build material corresponding to the pattern data or to the modified object model data (the modified object model data being modified to include the pattern data or modified to include an additional component etc.). In other examples, the control data may be to control a print agent applicator to apply print agent onto a layer of build material corresponding to the second set of object model data to generate the second object (with reference to block 226). In some examples, the print agent, to be applied by the print agent applicator under the control of the control data, may comprise a fusing agent and/or a detailing agent and/or a binder agent depending on the example. In some examples, executing the policy-based action at block 108 may comprise determining the control data and/or determining print instructions to generate the object according to the policy-based action.

In examples where the object model data is modified data to include pattern data, the pattern may be to be formed in the geometry of the object, e.g. is to be part of the object itself. Therefore, in these examples, applying fusing agent to build material according to the pattern data may mean that the pattern will be formed by solidified build material and therefore will form part of the object. In other examples, the pattern to be formed in the object, described by the pattern data, may be formed in the object by an absence of build material (thereby giving the appearance of the pattern being recessed into a portion of the object), and detailing agent may be applied to prevent fusing agent from migrating into areas of build material that correspond to the pattern. In other examples, the print agent may comprise other than a fusing agent or a detailing agent. For example, the print agent may comprise a fluorescence agent that is to cause the areas of build material to which the agent is applied, once the build material has solidified and/or cured and/or sintered, to fluoresce upon application of energy. In this example, the policy-based action may describe a fluorescing pattern to be formed in the object. In another example, the print agent may comprise a coloured agent so that the portions of the object corresponding to the areas of build material to which the agent is applied are of a different colour to other portions of the object. In this example, the policy-based action may describe a coloured patter to be formed in the object. Other physical properties of the object could be modified (e.g. the object's rigidity and/or flexibility etc . . . ) As stated above, the modifications may comprise an overt or covert modification, which may be on the surface, under the surface, at a depth of the object, or any combination thereof, etc.

Block 114 of the method may comprise generating the object according to the modified object model data (e.g. the object model data, received at block 102, and modified at block 106). Block 114 may therefore comprise determining object generation instructions to generate the modified object described by the modified object model data. In some examples, as mentioned above, the object may be classified as an object of interest due to that object being a restricted object however in other examples the object may not be restricted. For example, the object may be classified as an object of interest based on the category or classification of that object, for example it may be determined that the object belongs to a category of objects that are to be manufactured for marketing purposes, or for analysis in industries (including 3D printing or manufacturing), or according to a set of manufacturing statistics. For example, the object may be an object of interest due to an identified similarity with an object for use in the healthcare, aviation, mobile phone industry etc. The classification of an object as "of interest" may also mean that the object is a known high value design (for example one that was leaked into the public domain and cannot be printed without a license). In these examples the policy action may be to stop printing and/or to trigger and invoice and/or a message to the operator (the policy may also described a condition where it is determined whether the user possesses the relevant license). In other examples, the object may belong to a particular class that is to be generated for a printing job where the associated action is to cause advertising material to be added to the object (or any existing advertising material to be fine-tuned), or to add relevant marketing material (such as a special offer) to the object, or to cause other objects to be produced. In these examples the policy may comprise the following set of condition, effect and action:

condition={is-object-type-equal-to-mobile-phone}
if true then execute effect={allow-object-generation} and
action1={retrieve-object-model-data-describing-mobile-phone-case} and
action2={modify-object-model-data-of-phone-to-include-advertising-material}

In other examples, a different number of conditions and/or effects and/or conditions may exist depending on the example. By way of example:

condition1={does-object-belong-to-class A}
if true then condition2={is-current time after hours} if true then effect1={allow-object-generation} and policy1={scale-up-object-by-factor-of-two} if false then effect2={deny-object-generation} and policy2={notify-admin} if false then effect3={deny-object-generation} and policy3={notify-admin}

In the above example, effect2 of denying the object generation may comprise denying the object generation until a specified time. In these examples the effect may be based on the current time, for example the denial of the object generation may be based on the current time being after hours.

Figure 3:
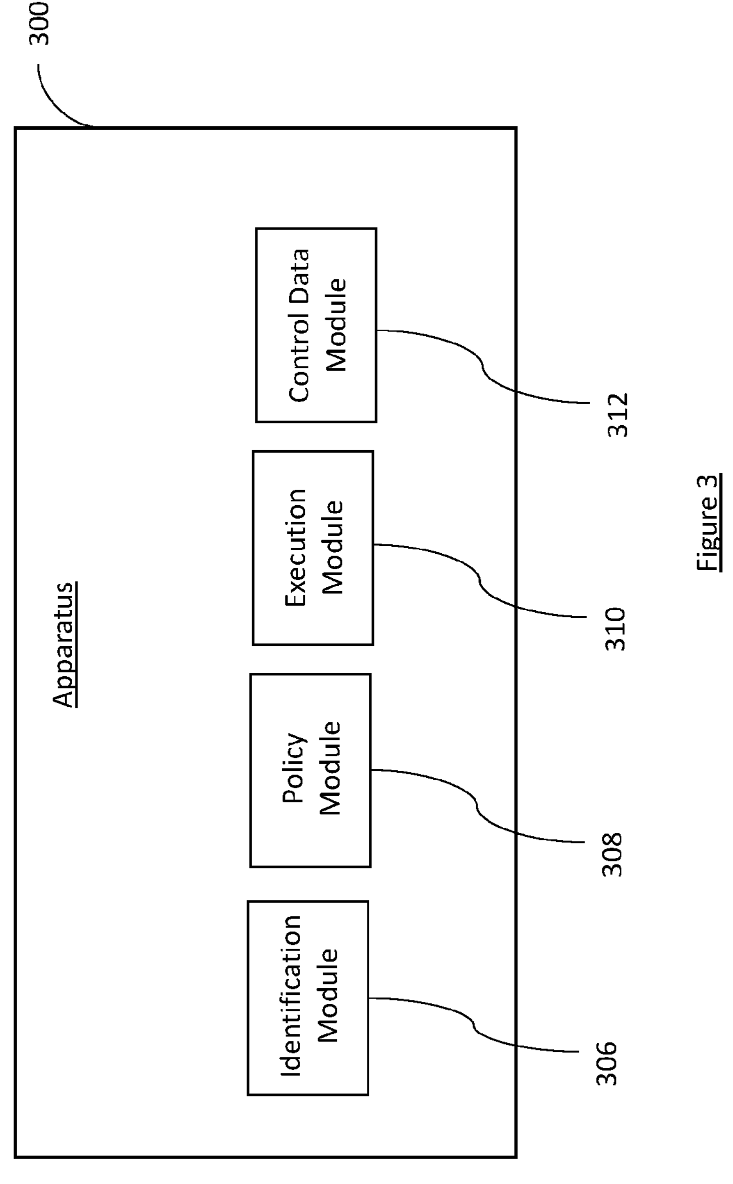
FIG. 3 is a schematic diagram of an example apparatus.

FIG. 3 shows an example apparatus 300. The apparatus 300 comprises may be to perform the method 100 as described above (e.g. any one of the blocks 102-114 of the method 100). The apparatus 300 comprises an identification module 306, a policy module 308, an execution module 310, and a control data module 312. The identification module 306 is to determine, based on the object model data, whether a portion of the object described by the object model data is identified as an object of interest. For example, the identification module 306 may be to perform block 104 of the method 100. The policy module 308 is to determine if there is a policy-based action associated with the object identifier determined by 306. For example, the policy module 308 may be to perform block 106 (and therefore any of blocks 210-228) of the method 100. The execution module 210 is to execute the policy-based action (determined by the policy module 208). For example, the execution module 210 is to perform block 108 of the method 100. The control data module 312 is to generate control instructions to generate the object according to the policy-based action. For example, the control data module 312 is to perform block 110 of the method 100. Each of the modules described above may comprise a processor. The apparatus 300 may comprise a 3D printing apparatus. In some examples the modules of the apparatus 300 may comprise a portion of processing circuitry, the apparatus 300 comprising the processing circuitry (see the example of FIG. 4) however in other examples the modules may be to execute machine-readable instructions to realise the functions of each module. For example, the modules may comprise a hardware component of the apparatus with each module being to execute their stated function, or the modules may be effectuated by the execution, e.g. by a processor, of machine-readable instructions, for example stored in a memory (in which case the module may be implemented by executing the instructions) or the modules may be implemented by a processor operating according to instructions, for example, embedded in processing circuitry (for example, logic circuitry).

Figure 4:
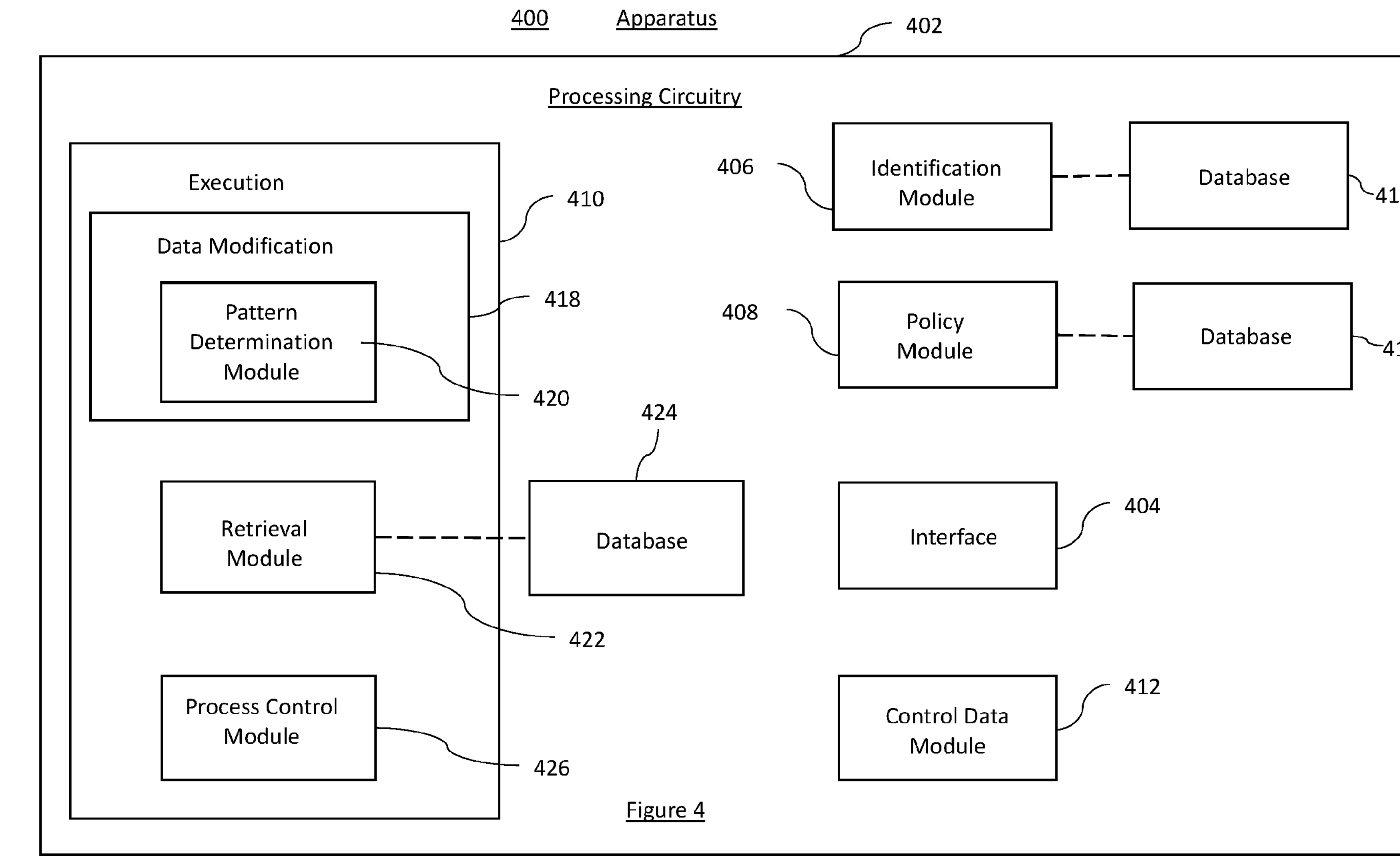
FIG. 4 is a schematic diagram of an example apparatus.

FIG. 4 shows an example apparatus 400. The apparatus 400 of this example comprises the apparatus 300 as described above. The example apparatus 400 comprises processing circuitry 402 which comprises an identifier module 406, a policy module 408, an execution module 410 and a control data module 412, as described above for the apparatus 300 with reference to FIG. 3. The apparatus 400 in this example comprises an interface 404 to operate on object model data describing an object to be generated in an additive manufacturing process, although in other examples (such as that described with reference to FIG. 3) the apparatus may not comprise an interface. For example, the interface 404 may be to perform block 102 of the method 100.

The execution module 410 may comprise a data modification module 418 which may be to perform any one of the blocks 210-218 as described above. For example, the data modification module 418 may be to modify object model data to create modified data and/or to change the resolution of a portion of the object described by the object model data and/or remove a portion of the object described by the object model data (e.g. as described above with reference to blocks 216 and 218), depending on the policy-based action that is associated with the object of interest. The data modification module 418 may be to change part of the object model data to change and/or add a feature to the object, depending on the policy-based action that is associated with the object of interest. For example, the module 410 may be to perform any of the modifications to the object model data, and therefore to the object, as described above. The module 418 may be to generate modified object data. The data modification module 418 may comprise a pattern determination module 420 to perform block 212 as described above. For example, the pattern determination module 420 may be to generate pattern data or object model data describing the pattern according to the policy-based action associated with the object. The execution module may comprise a retrieval module 422 to retrieve a second data set, e.g. to perform block 226 as described above. For example, the retrieval module 422 may be to retrieve a data set according to the policy-based action. For this purpose the retrieval module 422 may be to access a database 424 storing object model data. For example, in accordance with a policy-based action that is to cause a second set of object model data to be generated and/or recommended to a user to generate, the retrieval module 422 may be to access the database 424 and retrieve the second set of object model data. The execution module may comprise a process control module 426 which may be to perform block 220 and/or block 222 as described above. For example, the process control module 426 may be to control, or adjust, a part of the printing process. For example, the process control module 426 may be to cause a delay in the printing process or to cause a different build material to be used to generate the object or to cause a different print agent to be used in the printing process, etc., depending on the nature of the policy-based action associated to the object of interest.

The identification module 406 may be to compare a part of the object model data, operated on at the interface 406, with stored data to determine whether the object model data described is an object of interest (as will be descried below with reference to FIG. 4). The identification module 406 may comprise an artificial neural network to identify, or classify, a portion of the object as an object of interest based on the object model data, the module 406 thereby determine whether a portion of the object is an object of interest.

The processing circuitry 402 may comprise a database 414 which may be to store data describing objects of interest objects in examples where a portion of the object is compared to stored data to determine if the portion is identified as an object of interest (e.g. a target object, a restricted object etc.). The database 414 may therefore comprise an objects-of-interest database, which may comprise a weapons database, or a rights-restricted database etc. The identification module 406 is therefore communicably connected to the database 414 and is to compare part of the object model data to stored data in the database to determine whether part of the object model data is at least a partial match to the stored data. In other words, the determination that a portion of the object is an object of interest may be made on an incomplete, or partial match, or when enough of the object model data is similar within a predetermined threshold to be identified as restricted. The identification module 406 may be to compare part of the object model data to stored data in the database 414 to determine the class or type or category of the portion to categorise the portion of the object as an object of interest (this identification being based on the class, type of category).

The processing circuity 402 comprises a database 416 to store a policy-based action and the policy module 408 is communicable coupled to the database 416 to access the database to determine if there is a policy-based action associated with the object and to retrieve the policy-based action from the database, wherein the execution module is to execute the retrieved policy-based action. The policy module 408 is also to access the database 416 to determine if there is a policy-based action associated with the object type and to retrieve the policy-based action from the database, wherein the execution module. The database 416 may therefore store policy-based actions according to object type/category/class etc.

Figure 5:
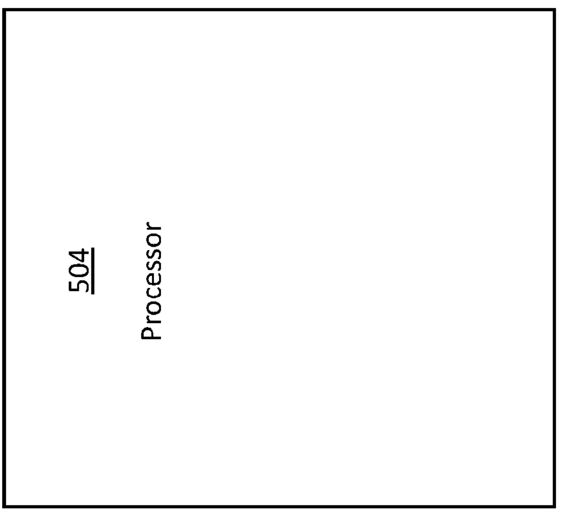
FIG. 5 is a schematic diagram of an example machine-readable medium in association with a processor.
Figure 5:
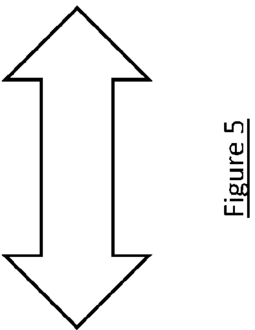

FIG. 5 shows an example non-transitory machine-readable, or computer-readable, medium 502 comprising a set of machine-readable, or computer-readable, instructions 506 stored thereon. The medium 502 is shown in FIG. 5 in associated with a processor 504. The instructions 506, when executed by the processor 504, are to cause the processor to execute a policy-based action associated with an object described by machine-readable object data describing an object of interest and to generate the object according to the machine-readable object data and the policy-based action. The instructions, when executed by the processor, may be to cause the processor to perform any number of the blocks of the method 100 as described above. For example, the instructions may be to cause the processor to change a portion of the object to be generated (for example in accordance with the modified machine-readable data, modified according to the policy-based action associated with that object type). The instructions 506 may be to cause the processor to operate on the machine-readable data, e.g. as described above for block 102 of the method 100. The instructions 506 may be to cause the processor to determine whether a portion of the object described by the machine-readable data is an object of interest, e.g. as described above for block 104 of the method 100. The instructions may be to cause the processor to determine whether there exists an associated policy-based action for the object of interest, e.g. as described above for block 106 of the method 100. As also described above, the instructions may be to cause the processor to categorise a portion of the object. In other words, the instructions may be to cause the processor to determine whether a portion of the object belongs to a category, type, or class etc. of interest, to determine whether the portion is an object of interest. In these examples, the instructions may be to cause the processor to determine whether there exists an associated policy-based action for that object type. The instructions may cause the processor to generate the object according to the machine-readable data and according to the policy defined by the policy-based action. As described above, the policy may be to cause the machine-readable data to be modified (e.g. to include a pattern (such as an identification code or picture or marketing information), to cause a change in the resolution of the object, and/or to cause removal of a portion of an object) in which case executing the policy-based action may cause the machine-readable data to be modified according to the policy. In other examples, the policy may be to cause a change an adjustment in the printing process, for example to cause a print job (e.g. the generation of the object) to be delayed or to cause the build material used to generate the object to change in which case executing the policy-based action may cause the print job to be delayed or the build material to be changed. In other examples the policy may be to cause a programmable element of the object to be programmed according to a set of instructions in which case executing the policy-based action may cause the programmable element to be programmed according to the policy. In other examples the policy may be to cause a second set of data to be retrieved so that a second object (defined by the second set of data) may be printed with or after the first object, or an alert may be issued alerting the user that the printing of the second object is recommended etc. In yet other examples the policy may be any number or combination of those policies described above, e.g. a policy may be to cause a programmable element to be programmed, the print job to be delayed, and marketing material to be printed on the object, etc.

The instructions 506, when executed by the processor 504, may therefore be to cause the processor 504 to perform the method 100. For example, the instructions 506, when executed by the processor 504, may be to cause the processor 504 to perform any of the blocks 102-110 and/or 210-228 as described above. Either the apparatus 300 or the apparatus 400 may comprise the processor and may be for receipt of the machine-readable medium 502.

Some of the examples herein therefore enable an object, a portion of which is identified as "of interest" to be printed according to an associated policy. The policy may be associated to that particular object or to a general type/class of object to which that object belongs. Some examples are applicable where the object of interest is a dangerous/illegal object in which case the policy may be to modify part of the object model data so that, when the policy is executed, the data is modified to create modified data and the object may be generated according to the modified data (and may no longer be dangerous/illegal having been modified). In other examples an object may be a rights-restricted object in which case the policy may be to cause a check to occur to determine whether the user possesses the relevant policy. In yet other examples the object of interest may be a type or class of object and may not be a restricted/dangerous object etc. or may be an object for which there is an associated policy. According to some examples, the policy-based action is executed and the object is generated according to its object model data and according to the policy. For example, when the policy is to modify the data then the object generation may proceed according to the modified data. In other examples, where the policy is to modify another part of the printing process (e.g. delay the job or change the build material to be used in the job) then the object may be generated according to the object model data and according to the policy. These examples may ensure a minimal disruption to the manufacturing process. Moreover, according to these examples, objects themselves are not removed from the production line but rather they are printed according to an associated policy. The methods (more specifically the blocks thereof) described herein may be performed inside a printing device prior to commencing manufacturing or even at an earlier stage in the printing process, for example prior to the object being compiled into a print job.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks the flow charts and/or block diagrams, can be realized using machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus (such as the modules described above with reference to the apparatuses 300 and 400 of FIGS. 3 and 4) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine readable instructions may also be loaded onto a computer or other programmable data processing device(s), so that the computer or other programmable data processing device(s) perform a series of operations to produce computer-implemented processing, thus the instructions executed on the computer or other programmable devices realize functions specified by block(s) in the flow charts and/or the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:

determining, by a processor, based on first object model data describing a first object to be generated in an additive manufacturing process, that a portion of the first object to be generated is identified as an object of interest;

in response to a determining that the portion of the first object is identified as the object of interest, determining, by the processor, that a policy-based action is associated with the object of interest;

in response to determining that the policy-based action is associated with the object of interest, executing, by the processor, the policy-based action, comprising: retrieving second object model data describing a second object to be generated in the additive manufacturing process; and causing, by the processor, the first object and the second object to be generated in the additive manufacturing process.

2. The method of claim 1, wherein executing the policy-based action further comprises:

causing the first object model data to be modified, and wherein the first object is caused to be generated in the additive manufacturing process according to the modified first object model data.

3. The method of claim 2, wherein executing the policy-based action further comprises:

determining pattern data describing a pattern to be formed on the portion of the first object, and wherein the first object model data is modified to include the pattern data.

4. The method of claim 2, wherein executing the policy-based action further comprises:

causing a resolution of the portion of the first object to be changed, and wherein the portion of the first object is caused to be generated in the additive manufacturing process at the changed resolution.

5. The method of claim 2, wherein executing the policy-based action further comprises:

causing the portion of the first object to be removed from the first object model data, and wherein the first object is caused to be generated in the additive manufacturing process without the portion.

6. The method of claim 1, further comprising, in response to determining that the portion of the first object is identified as the object of interest:

determining, by the processor, based on the first object model data, a category of the portion of the first object, and wherein determining that the policy-based action is associated with the object of interest comprises determining that the policy-based action is associated with the determined category.

7. The method of claim 1, wherein executing the policy-based action comprises:

causing generation of the first object and the second object to be delayed.

8. The method of claim 1, wherein the first object model data is a first set of object model data describing the first object, and wherein the second object model data is a second set of object model data describing the second object.

9. The method of claim 1, wherein executing the policy-based action further comprises:

programming a programmable element of the first object defined by the first object model data.

10. The method of claim 1, wherein executing the policy-based action further comprises:

causing a change in the additive manufacturing process.

11. The method of claim 10, wherein causing the change in the additive manufacturing process comprises:

changing a composition of a building material from which the first object is caused to be generated in the additive manufacturing process, and wherein the first object is caused to be generated in the additive manufacturing process from the changed composition of the building material.

12. The method of claim 10, wherein causing the change in the additive manufacturing process comprises:

changing a print agent to be used to generate the first object in the additive manufacturing process, and wherein the first object is caused to be generated in the additive manufacturing process using the changed print agent.

13. An apparatus comprising:

a processor; and a memory storing instructions that, when executed by the processor, cause the processor to perform processing comprising:

determining, based on first object model data describing a first object to be generated in an additive manufacturing process, that a portion of the first object to be generated is identified as an object of interest;

in response to determining that the portion of the first object is identified as the object of interest, determining that a policy-based action is associated with the object of interest;

in response to determining that the policy-based action is associated with the object of interest, executing the policy-based action, comprising: retrieving second object model data describing a second object to be generated in the additive manufacturing process; and causing the first object and the second object to be generated in the additive manufacturing process.

14. The apparatus of claim 13, wherein executing the policy-based action further comprises:

causing the first object model data to be modified, and wherein the first object is caused to be generated in the additive manufacturing process according to the modified first object model data.

15. The apparatus of claim 13, wherein executing the policy-based action further comprises:

causing a change in the additive manufacturing process.

16. The apparatus of claim 15, wherein causing the change in the additive manufacturing process comprises either or both of:

changing a composition of a building material from which the first object is caused to be generated in the additive manufacturing process, wherein the first object is caused to be generated in the additive manufacturing process from the changed composition of the building material; and changing a print agent to be used to generate the first object in the additive manufacturing process, wherein the first object is caused to be generated in the additive manufacturing process using the changed print agent.

17. A non-transitory computer-readable storage medium storing instructions that, when executed by a processor, cause the processor to perform processing comprising:

determining, based on first object model data describing a first object to be generated in an additive manufacturing process, that a portion of the first object to be generated is identified as an object of interest;

in response to determining that the portion of the first object is identified as the object of interest, determining that a policy-based action is associated with the object of interest;

in response to determining that the policy-based action is associated with the object of interest, executing the policy-based action, comprising: retrieving second object model data describing a second object to be generated in the additive manufacturing process; and causing the first object and the second object to be generated in the additive manufacturing process.

18. The non-transitory computer-readable storage medium of claim 17, wherein executing the policy-based action further comprises:

causing the first object model data to be modified, and wherein the first object is caused to be generated in the additive manufacturing process according to the modified first object model data.

19. The non-transitory computer-readable storage medium of claim 17, wherein executing the policy-based action further comprises:

causing a change in the additive manufacturing process.

20. The non-transitory computer-readable storage medium of claim 19, wherein causing the change in the additive manufacturing process comprises either or both of:

changing a composition of a building material from which the first object is caused to be generated in the additive manufacturing process, wherein the first object is caused to be generated in the additive manufacturing process from the changed composition of the building material; and changing a print agent to be used to generate the first object in the additive manufacturing process, wherein the first object is caused to be generated in the additive manufacturing process using the changed print agent.

* * * * *